United States Patent [19]

Levasseur et al.

[11] 4,105,867
[45] Aug. 8, 1978

[54] CONTROL CIRCUIT FOR PAY TELEPHONES AND THE LIKE

[75] Inventors: Joseph L. Levasseur; William A. Seiter, both of St. Louis County, Mo.

[73] Assignee: H. R. Electronics Company, High Ridge, Mo.

[21] Appl. No.: 765,931

[22] Filed: Feb. 7, 1977

[51] Int. Cl.² .......................................... H04M 17/02
[52] U.S. Cl. ................................. 179/6.3 R; 194/44
[58] Field of Search ................... 179/6.3 R, 6.31, 6.4, 179/6.5, 2 BC; 194/1 N, 10, 44

[56] References Cited

U.S. PATENT DOCUMENTS

| | | | |
|---|---|---|---|
| 3,510,584 | 5/1970 | Krasin et al. | 179/2 BC |
| 3,639,692 | 2/1972 | Krasin et al. | 179/2 BC |
| 3,728,490 | 4/1973 | Nowicki | 179/6.3 R |
| 3,794,770 | 2/1974 | Tabiichi et al. | 179/6.3 R |
| 3,842,210 | 10/1974 | Dawson | 179/6.3 R |
| 4,028,494 | 6/1977 | Zarouni | 179/6.31 |

*Primary Examiner*—Kathleen H. Claffy
*Assistant Examiner*—Gerald L. Brigance
*Attorney, Agent, or Firm*—Charles B. Haverstock

[57] ABSTRACT

A control circuit for a pay phone including a coin unit where money is deposited and validated, an entry circuit having a first input connected to the coin unit for entry of amounts deposited, a second input to the entry circuit for communicating thereto call price information, a control element operable in response to deposits of an amount at least equal to the call price for enabling the customer to dial his call and to enable phone communication with the dialed phone, and apparatus to control payback of excess amounts deposited. The control circuit is preferably powered by a rechargeable energy source that may optionally be connected to the telephone line to derive charging current therefrom to maintain the charge on the energy source. The present control circuit may employ optical or other forms of couplers to establish connections to communicate the dialing mechanism and telephone handset with its associated transmission controls to the telephone line.

47 Claims, 3 Drawing Figures

U.S. Patent   Aug. 8, 1978   4,105,867
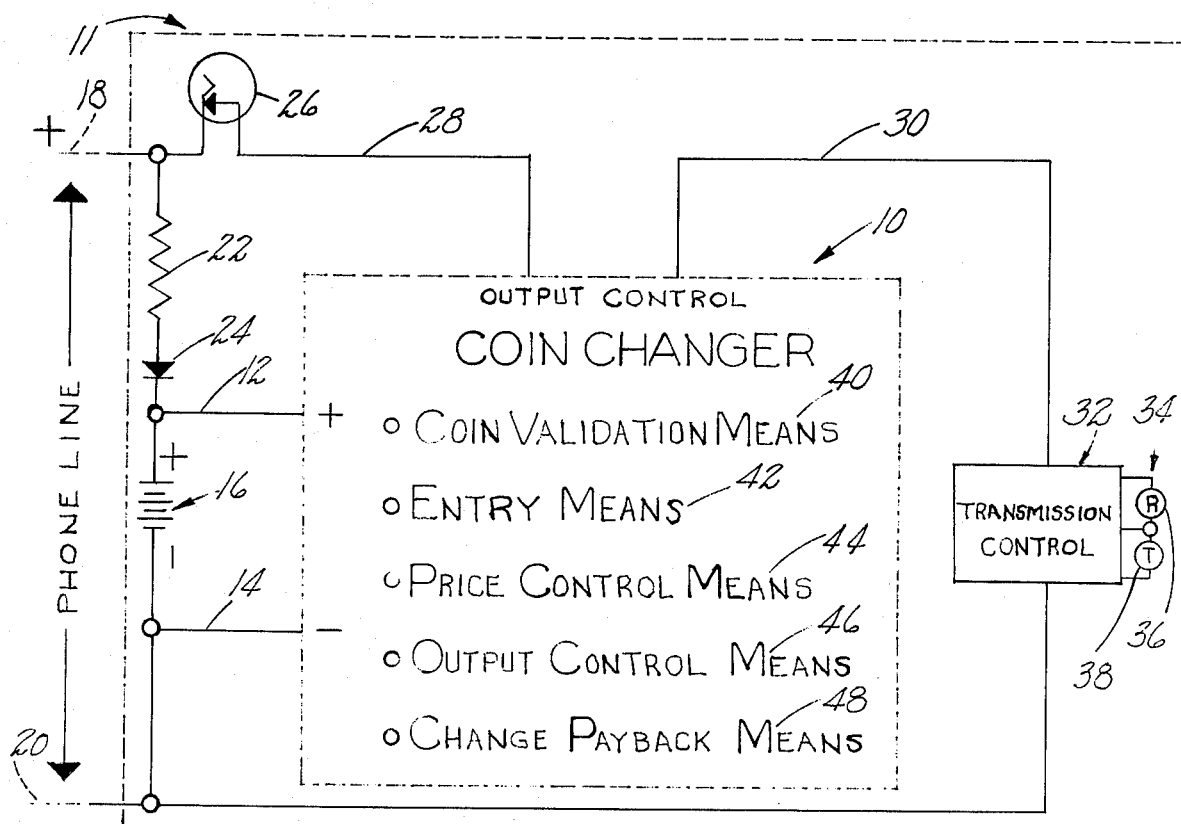
FIG 1
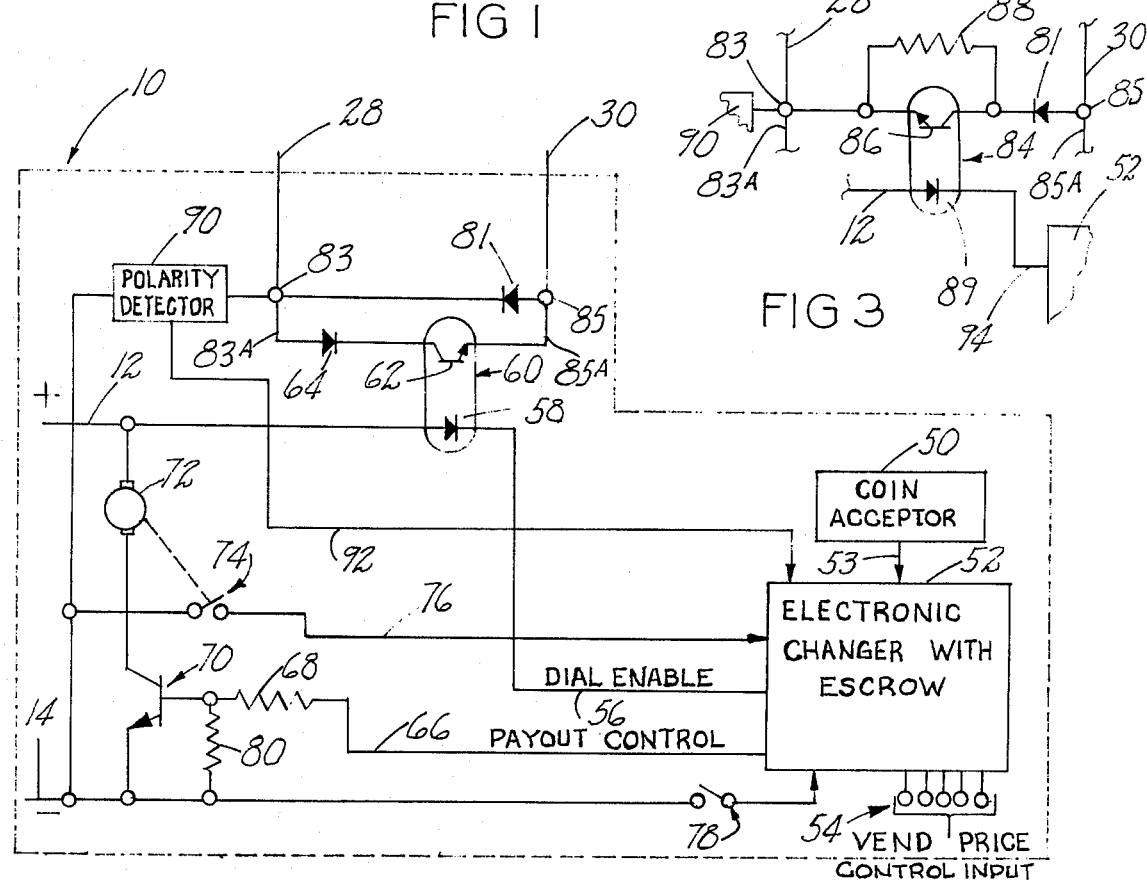
FIG 2
FIG 3

CONTROL CIRCUIT FOR PAY TELEPHONES AND THE LIKE

Pay phones and vending control means are well known and many forms of both have been in existence for many years. Known pay phone devices, however, are relatively limited in their operations and for the most part are not easily adaptable to being changed to accommodate different call rates. Moreover, the known devices are not able to make change, require means that hold the particular coins deposited during each operation, and are only able to return the same coin or coins that are deposited during each operation. These and other limitations and shortcomings of the known pay phone devices are overcome by the present control means, which includes features that substantially increase the versatility and flexibility of pay telephones. Some of the advantages obtained because of these features are facilitated through the use of equipment which has been adapted in unique ways from equipment used in the vending art in order to operate with a pay telephone, and some of the equipment that has been so adapted from the vending art includes vending control means, and especially control means including coin units with coin validation features, accumulator or entry means with means for entering deposits and vend price information, output control means responsive to coin deposits and vend price information, escrow means for refunding amounts deposited, and means for paying back excess amounts deposited. Vending control means which have various of these and other features are disclosed in U.S. Pat. Nos. 3,307,671; 3,687,255; 3,820,642; 3,828,903; 3,841,456; 3,894,220, and in 4,034,839, all assigned to Applicants' assignee. No known pay phones employ such types of control means. The means in use on the known pay phones for receiving and holding coins deposited and effecting operations to enable the placing of a call are limited in capability since all the coins deposited must be held in a temporary retention status thereby limiting any coin accumulation means to a maximum value dependent upon the size and other physical characteristics of the coin retention means and the coins deposited. Moreover, the control means in use on known pay phones are primarily mechanical or electromechanical and the known pay phones, for the most part, therefore, are relatively slow operating, are large, bulky, and expensive to construct, require relatively frequent maintenance, and are difficult to modify or adjust to accommodate different call prices. The present construction overcomes these and other disadvantages and shortcomings of the known devices. Furthermore, known devices, for the most part, obtain their operating current by tapping the phone line leads, and because only a relatively small amount of current is available thereon, electrical or electromechanical components in known pay telephones must operate on low current. The present device preferably includes an energy source that is capable of providing a greater amount of operating current than can be obtained by merely tapping the phone line leads, and thus permits the use in the device of electrical components, such as various types of payback motors, relays, and other devices, which draw relatively large amounts of current. The energy source employed is preferably a compact, self-contained unit, such as a storage battery, and preferably has means therewith for maintaining the charge thereon by taking charging current from the phone line leads. While it is recognized that many other power sources could be equally well employed to supply power for the present device, and that such sources need not be connected to the phone line leads, a power source such as just described offers the advantage of providing relatively large amounts of current for operation of the present device while obtaining all the power required to maintain its capability by connection to the phone line leads.

It is therefore a principal object of the present invention to provide a pay phone construction that is more flexible and versatile than any known device used for the same or similar purposes.

Another important object is to make possible the use of pay phone constructions that require relatively large currents for operation.

Another object is to enable pay phones to make change and to effect refund from coin storage devices that are independent of the coins deposited during each operation.

Another important object is to provide a change-making pay phone construction that can derive all required operating current by connection to a phone line.

Another object is to teach the construction and operation of a battery operated pay telephone wherein the battery is recharged by current taken from the telephone line.

Another object is to simplify the method of changing the cost of making a call from a pay phone.

Another object is to teach the construction and operation of a pay telephone control circuit that is compatible with existing telephone equipment.

Another object is to teach the construction and operation of a pay phone which uses solid state devices and which is relatively trouble free.

Another object is to extend the useful life of a battery by maintaining the charge thereon at or near a fully charged condition by trickling charge therethrough from a telephone line.

Another object is to adapt vending control circuits and related devices for use with pay telephones.

Another object is to make change in a pay telephone so that the caller can place a call even if he does not have the exact required change.

Another object is to enable full escrow or deposit payback from a pay phone after deposit and prior to completion of a call.

These and other objects and advantages of the present invention will become apparent after considering the following detailed specification in conjunction with the accompanying drawing, wherein:

FIG. 1 is a schematic diagram of a pay phone station in a typical phone system showing the subject device as it is connected to the phone system;

FIG. 2 is a schematic wiring diagram of a control circuit embodiment constructed according to the present invention showing the more important connections required among various components of the subject control circuit; and FIG. 3 is a schematic wiring diagram showing additional circuitry that may optionally be usefully employed in the circuit of FIG. 2 with some telephone systems.

Referring to the drawing more particularly by reference numbers, number 10 identifies a coin changer unit and control means, shown in block outline, which is part of a pay phone station 11 and includes the basic components of the subject control circuit. Also shown in FIG. 1 are connections among the changer unit 10, a battery source 16, and various components of the pay phone station 11. Of particular importance are connections 12 and 14 which connect opposite terminals of the battery source 16 to changer unit 10 to provide energy for operating the devices included within the changer unit 10. The telephone line includes input leads 18 and 20, being shown in FIG. 1 with the lead 18 of positive polarity and the lead 20 of negative polarity. The leads 18 and 20 are connected across a circuit that includes a resistor 22 and a diode 24 connected in series with the battery 16 such that when the pay phone station 11 is inactive the telephone line will trickle current through the battery 16 to maintain the charge on the battery and to maintain the useful battery life. This means that the battery 16 will be maintained in a fully or substantially fully charged condition at all times. In conventional phone systems the amount of current available on the phone line leads is relatively small and electrical components having relatively large current requirements can therefore generally not be satisfactorily operated off of available phone line current. The battery 16 is chosen to be capable of providing a greater amount of current to operate the subject control circuit than would be available by tapping the phone line leads directly, thus permitting the use of electrical components having relatively large current requirements in the subject control circuit. It is recognized that other sources of power having relatively large current availability may be employed and that the current available on the phone line leads may, in appropriate circumstances, be sufficient to power the subject control means if elements having low current requirements are employed in the circuit. Use of the battery 16, however, avoids such restrictions.

The telephone line lead 18 is connected to a dial mechanism 26 of conventional construction. The opposite side of the dial mechanism 26 is connected by lead 28 to coin changer 10, and another lead 30 is connected from the coin changer 10 to transmission network 32, also of known construction. The transmission network 32 has connections to a telephone handset 34, which includes receiver portion 36 and transmitting or speaker portion 38, and the network is also connected to the telephone line lead 20. In order for a telephone call to be effected, connection must be made through the control circuits between the leads 28 and 30, and in the device as shown in FIG. 2 the means for accomplishing this include a controllable optical coupler device which will be described later but which is not per se part of the present invention. It is contemplated that other forms of coupler devices to complete the circuit connection between the leads 28 and 30 can also be used, if desired.

Referring again to FIG. 1, the components in coin changer 10 include coin validation means 40, entry or accumulation means 42, price control means 44, output control means 46, and change payback means 48. The individual respective circuit portions 40-48 may be of known construction and may be adapted from similar type devices presently known and used by the vending industry. For example, these circuit portions can be similar to corresponding circuit portions of the devices shown in the above identified patents.

The coin validation means 40 may be included in coin acceptor means 50 and include features which enable the distinguishing between valid or genuine coins and counterfeit coins or slugs. If the coins deposited are valid coins, they will operate switches or other detecting devices in the coin acceptor unit 50 which cause signals to be fed to the entry or accumulation means 42 in the coin changer circuit 10. Coin validation and coin acceptor means as well as means for transmitting signals from coin validation means to entry or accumulation means are well known in the vending industry and may take many forms. Representative of one such validation and transmittal configuration that may be employed is that disclosed in U.S. Pat. No. 3,841,456, wherein a programmable clock is utilized to generate signals in response to various credit inputs and to transmit such signals to an entry or accumulation means. However, many other configurations and techniques may also be employed, including, for example, any type coin acceptor capable of generating outputs representive of the value of coins deposited, such as those coin acceptors disclosed in the U.S. patents previously referenced.

The outputs from such coin acceptors are typically fed to entry or accumulation means such as the entry means 42 in the changer circuit 10. In FIG. 2 the means 42 are included in the block element 52, labeled Electronic Changer With Escrow, and the signals are transmitted from coin acceptor 50 to electronic changer 52 by means of one or more leads 53. Although the block 52 is labeled electronic changer it is to be recognized that various components included therein may be mechanical or electromechanical. The accumulation or entry means 42 can take many forms and may include circuits comprised of or including counters, shift registers, ring counters, adders, comparators, or other registers or data storage means, to mention a few, and circuit elements can be either serially or parallel fed depending on the circuit construction.

Typical of an electronic changer with escrow that may be employed in the present invention is that disclosed in U.S. Pat. No. 3,841,456, although it will be recognized that utilization of such an electronic changer with the circuitry required by the present invention may require some limited, minor changes in the electronic changer circuitry since the "vending" operation in the present invention essentially involves the placing and completion of a call by a calling party to a called party instead of the vending of a product from a vending machine. For instance, in the configuration of FIG. 2, if an electronic changer of the type described in U.S. Pat. No. 3,841,456 were employed, the vend enable signal, which signal is generated in the changer whenever a vend price has been entered into the changer and a credit deposit at least equal to the vend price has been accumulated, could be employed to cause the Dial Enable lead 56 of the present invention to go low to allow the placing of a call, and the lead 92 from the polarity detector 90 of the present invention could be connected to the vend enable input of the vend control of the changer to signal completion of a call vend to permit other vend control circuitry to initiate any necessary payback of excess deposits and to inhibit further payback under an escrow demand. Many, various, other ways of employing the changer of U.S. Pat. No. 3,841,456, and other changers as well, with the circuitry of the present invention exist, and all such changers may be employed, recognizing that the placing and completion of a phone call differs in some respects from the vending of a product from a vending machine and that minor circuit modifications to some of the referenced changers, which modifications may be relatively easily accomplished by those knowledgeable in the art, may therefore be necessary to permit the use of any particular known changer as a component in the present invention. It will be recognized that the above description wherein the changer described in U.S. Pat. No. 3,841,456 is employed in the present invention illustrates the use of only one, particular, known changer that could be employed in the present invention, and that other changers could be equally as well employed.

The block 52 also has connected to it a plurality of input terminals 54, labeled Vend Price Control Input, and the signals produced on these input leads cause the vend price, which in the case of a pay phone is the call price, to be entered in the changer circuitry. The call price for the subject pay phone 11 is the cost to make a particular call and this amount is generally pre-set by the service man. For example, the cost to make a three minute telephone call within a particular dialing area may be twenty cents, and if this is the case, appropriate signals corresponding to a twenty cent price are entered on the pricing terminals 54. If the cost to make a call should change to twenty-five cents for a three minute call, an appropriate adjustment can be made. One way in which this can be done quickly and easily is by a service person simply changing the setting of a plurality of switches of a type such as those disclosed in U.S. Pat. No. 3,820,642. The vend price control input terminals 54 shown in FIG. 2 and the means for entering signals thereon correspond generally to the price control means 44 of the subject control circuit shown included in coin changer 10 in FIG. 1.

When the handset 34 of the pay phone station 11 is removed from its cradle and an amount at least equal to the call price is deposited, the placing of a call from the pay phone station is then possible and may be initiated, as will be more fully explained hereinafter, such as by dialing the desired number by means of dial mechanism 26, which operation effects establishment of circuits in the telephone system and causes the phone of the called party, under control of the telephone system, to begin to ring. When the called party thereafter removes the handset of his telephone from its cradle, the call is completed and the caller and the called party may carry on their conversation. When the parties thereafter terminate their conversation and hang up their handsets, the call is concluded and the telephone system and the pay phone station are returned to a condition whereby further calls may be placed. Thus, if a party wishes to place a call from the pay phone station 11, he removes the handset 34 from its cradle and begins to deposit coins in the coin acceptor unit 50. When the amount deposited at least equals the call price the electronic changer 52 will produce an output signal, detected as a change of state, on lead 56, labeled Dial Enable. This change of state or other output will cause current to flow through light emitting diode portion 58 of optical coupler 60, thereby producing light emission which causes the normally non-conducting transistor portion 62 of the optical coupler 60 to become conductive and to begin to conduct since diode 64 is forward biased at this time. This effects a circuit completion between the dialing means 26 and the transmission control 32 through leads 28 and 30. As has been indicated, the completed circuit for dialing includes therein diode 64 which is an isolation diode, the purpose of which will be explained in further detail later. The completed circuit thereafter operates in the usual manner so that when the desired number has been dialed, circuits will be established in the telephone system call control means (not shown) in response to the call data signal generated on the telephone line by the dialing operation, and the completion of these circuits will cause the dialed phone to ring.

If an amount of money has been deposited which is in excess of the amount necessary to complete a call, the change payback means 48 will be activated at some point in the call sequence to refund the excess amount. Activation of the change payback means 48 may occur at any time after an amount sufficient to make a call has been deposited and detected. Such activation may occur immediately upon detection of the excess deposit condition, or it may be delayed until some later time, such as until the call has been completed by the called party answering his phone or even until after the call has been concluded and the parties have hung up. Various means for effecting this activation may be employed, several of which are described in more detail hereinafter.

When the payback means 48 are activated, an output signal from the electronic changer 52 will be generated on lead 66, labeled Payout Control. The status of lead 66 controls other circuit means in the payback means 48 which cause the paying back of excess deposits. The payout signals are applied through a resistor 68 to the base of a transistor 70, which has a biasing resistor 80 connected between its base and emitter and has its emitter and collector elements so connected as to complete a circuit for energizing change payout motor 72. When a payout signal is applied to the base of the transistor 70, the payout motor 72 will operate and in so doing will close a motor pulse switch 74 which is coupled thereto. Each time the change payout motor 72 operates it will refund a coin to the customer and in so doing will close the contacts of the switch 74 to cause an impulse to be fed back to the electronic changer 52. Similar operations will occur repeatedly until the amount of the excess deposit has been paid out, as determined by the changer 52. Thereafter, payout control line 66 will be maintained in a non-payback state and further payout operations will be prevented.

The determination by the changer 52 as to when to terminate payback may be effected in numerous ways. The value of coins deposited may be accumulated in entry means 42 and compared against the call price established by price control means 44, which includes the call price terminals 54, to ascertain if the value of the coins deposited exceeds the price of a call. If it is determined that an excess amount has been deposited, payback is initiated and coin payment signals are detected by the changer 52 on lead 76 as a coin or coins are paid out, as previously described. As each signal is detected on the lead 76 the changer undergoes an updating operation and performs a further operation to ascertain if a sufficient amount has been returned to the party making the call. Various methods of accomplishing these operations may be employed, as may adaptations of many well known changer constructions, including those which utilize comparator circuits such as those described in U.S. Pat. No. 3,841,456, or which utilize up/down counters or accumulators such as those described in U.S. Pat. No. 3,820,642.

The present changer circuit also has escrow capability, which is the ability to refund the total amount of a deposit prior to completion of a telephone call. The excrow circuit includes as escrow switch 78 which is connected to the emitter of the transistor 70 and, through lead 14, to the negative side of the battery 16. When a deposit is made, and prior to completion of the call, if the caller depresses the escrow switch 78, which is preferably located in the telephone handset cradle, the transistor 70 will be made to conduct and will operate the change payout motor 72 to produce a payback operation as previously described until a predetermined condition of the accumulation means 42 is reached, at which time the payback operation will terminate. The particular condition of the accumulation means 42 that will result in termination of the escrow payback is dependent to some extent upon the particular entry or accumulation means employed. As has been previously explained, the entry means may assume a variety of forms, and many known coin changers, including such as those disclosed in U.S. Pat. Nos. 3,820,642; 3,828,903; 3,841,456; and 3,963,035, and in pending application Ser. No. 631,721, filed Nov. 13, 1975, employ entry means which control escrow payback operations and the termination thereof. Note that with escrow the entire amount deposited is returned while in a payback operation only the amount deposited in excess of the call price is paid out.

In a typical telephone system the phone line leads 18 and 20 experience a polarity reversal upon completion of a telephone call to the called party. This is standard in many conventional telephone systems and is effected by known system circuitry. When the called party removes his handset from its cradle, a polarity reversal signal (not shown) is generated in the system call control means (not shown) causing the lead 18, which prior thereto has been maintained at a positive potential with respect to the phone lead 20, to become negative with respect to lead 20. Initially, when the pay phone station 11 is in an inactive state, lead 18 is positive with respect to lead 20, and this condition is maintained when the caller removes the handset 34 of the pay phone and begins to deposit coins in the coin acceptor 50. Consequently, diode 81 remains reverse biased at this time and, until sufficient coinage is deposited, the optical coupler 60 remains non-conductive. Once an amount of coinage at least equal to the call price is deposited, the resulting dial enable signal on lead 56 effects conduction by optical coupler 60, as previously described, thereby completing a circuit, which permits the call to be dialed, between the leads 28 and 30 by providing a current flow path between circuit nodes 83 and 85 through leads 83A and 85A, through the forward biased diode 64 and through the conducting transistor portion 62 of the optical coupler 60. When the called party thereafter removes the handset of his phone from its cradle, polarity reversal occurs on the leads 18 and 20 and the diode 64 becomes reverse biased, thus preventing reverse current flow therethrough and through the optical coupler 60, while the diode 81 becomes forward biased thereby providing a new current flow path between the nodes 83 and 85 and thus maintaining a circuit connection between the leads 28 and 30 despite the polarity reversal so as to permit conversation between the called party and the caller.

A polarity detector 90 is shown connected between leads 28 and 14, and the detector 90 has an output lead 92 connected to the changer 52. The detector 90 acts to detect the polarity status between the leads 18 and 20 since the lead 14 is connected to the phone line lead 20 and the lead 28 is connected to the phone line lead 18 through dial mechanism 26. When the called party removes the handset of his phone from its cradle and the polarity between the leads 18 and 20 reverses, this reversal is detected by the polarity detector 90 which produces an output signal on the lead 92 that is detected by changer 52 and used to indicate that the call has been completed. Receipt of the call completion signal on the lead 92 by the changer 52 results in collection by the subject device of an amount equal to the call price. In the construction shown, dial enable line 56 may be reset to a high status at any time after this polarity reversal has occurred since the polarity reversal effects a change in the current flow path between the circuit nodes 83 and 85, as previously described, such that circuit completion between the leads 28 and 30 is thereafter no longer through the transistor portion 62 of the coupler 60, and the diode portion 58 of the coupler 60 therefore need no longer be maintained in a conductive state by the presence of a low status on the line 56. Consequently, the call completion signal on the lead 92 may also effect a change of status on the dial enable line 56. At the conclusion of a telephone call, when both parties hang up, a second polarity reversal will take place under control of the telephone system call control means, and the system will return to its initial condition wherein the lead 18 is positive with respect to the lead 20.

As previously indicated, payback of excess amounts may occur at any time after coinage in excess of the call price has been deposited. Payback of excess amounts may be activated contemporaneously with generation of the dial enable signal output on the lead 56, in which event the excess amount is returned to the caller and an amount equal to the price of the call as established by the vend price signal on the terminals 54 is retained by the subject device pending completion of the call or an escrow demand. If the escrow switch 78 is thereafter activated, such as by replacing the handset of the pay phone in its cradle, the call price amount retained by the subject device is paid back under control of the escrow circuitry, as previously described. If the call is completed before an escrow demand is made, the retained call price amount is collected and will not be returned by a subsequent escrow demand.

Payback may also await the completion of the call, in which event the polarity reversal signal on the lead 92 may serve to both activate the payback means 48 to pay back the excess amount deposited and to effect collection by the changer 52 of an amount equal to the price of the call. In this situation an escrow demand made prior to call completion results in refund of the entire amount deposited while an escrow demand made after call completion will have no effect since collection of the call price will already have been made and payback of excess amounts will have been initiated.

It is recognized that in some instances it may be desirable for the telephone company to establish a call price for a particular unit of time, for example, twenty cents for each three minute interval. In telephone systems such as this timers are included within the control circuitry of the phone company to limit the duration of the calls placed. The party placing the call may wish to continue his phone conversation for more than one call time interval, and may wish to do so by the further deposit of additional coins without the necessity of re-initiating the call. FIG. 3 illustrates the use of timer activator circuitry that may be included within the subject device to accomplish this. An optical coupler 84, similar to optical coupler 60, may be placed in circuit between nodes 83 and 85, with the emitter of transistor portion 86 of the coupler 84 connected to the node 83 and to one side of a shunt resistor 88 across the coupler 84, and with the collector of the transistor portion 86 connected to the cathode of the diode 81 and also to the other side of the shunt resistor 88. The conductivity of the optical coupler 84 is controlled by normally conducting light emitting diode portion 89 thereof whose anode is connected to the lead 12 and whose cathode is connected by lead 94 to the changer 52. The lead 94 is normally maintained in a low state by the changer 52 so that the light emitting diode portion 89 of the optical coupler 84 is maintained in a normally forward biased mode, thereby resulting in light emission therefrom which enables the transistor portion 86 to be in a conductive state and to conduct whenever the diode 81 is forward biased.

As previously described, until the called party removes his phone handset from its cradle, the lead 18 is positive with respect to the lead 20 and the diode 81 remains reverse biased and non-conducting. When the called party removes his phone handset from its cradle, placement of the call has been completed and a first polarity reversal occurs on the leads 18 and 20 and is detected by the polarity detector 90 which generates a call completion output signal on the lead 92 to the changer 52.

This call completion signal is detected by changer 52 and causes it to assume a call completed status and to remain in that condition until a second polarity reversal occurs upon conclusion of the call, such as when one or both parties hang up. Detection of this completion signal by the changer 52 further results in generation of a timer activation pulse, the duration of which will be explained in more detail later, on the lead 94 causing the lead to momentarily change from a low to a high state, thus temporarily reverse biasing the light emitting diode portion 89 of the coupler 84 and causing the transistor portion 86 to become non-conductive for the duration of the pulse. The first polarity reversal also causes the diode 81 to become forward biased and to begin to conduct, and since the optical coupler 84 is temporarily being held in a non-conductive state by the high level of the lead 94, a current flow path of relatively high resistance is established between the nodes 83 and 85 through the forward biased diode 81 and the shunt resistor 88. Consequently, the current flow through telephone line leads 18 and 20, detectable by phone company equipment in the system call control means, is relatively low while the lead 94 remains high. At the conclusion of the timer activation pulse the lead 94 returns to its normal low state and the light emitting diode portion 89 of the coupler 84 again begins to conduct. Because the diode 81 is now forward biased the light emission from the diode portion 89 causes the transistor portion 86 to begin conducting, thus essentially introducing a short across the resistor 88 establishing a current flow path of relatively low resistivity between the nodes 83 and 85. Because of the decrease in circuit resistance occasioned by the return of the lead 94 to its normal low state from its temporary high state, the amount of current flowing through the circuit increases to a value distinguishably higher than that detectable on the leads 18 and 20 when the lead 94 is high. Known phone company equipment in the system call control means monitors the amount of current flowing through the circuit and, upon recognition of current variation indicative of the momentary inclusion of shunt resistor 88 in the circuit due to the generation of the timer activation pulse on the lead 94, such equipment activates a call period timer (not shown) in the phone company circuitry. The duration of the timer activation pulse generated on the lead 94 by the changer 52 is chosen to be sufficiently long to permit current changes occasioned thereby to be detectable by the phone company equipment. The minimal pulse duration will be dependent upon the particular values and characteristics of the phone system to which the subject device is attached. Timing out of the activated call period timer results in activation of a phone company recording informing the caller to deposit an additional amount in coins if he wishes to continue the conversation for an additional call period.

It is important to remember that the changer 52 is at this stage of the call in a call completed condition, as previously described, and will remain in such condition until a second polarity reversal occurs when the call is concluded. The deposit of coins by the caller while the changer 52 is in this call completed condition effects different results than did the deposit of coins prior to receipt by the changer 52 of the call completion signal on the lead 92. In the latter instance the deposit of a sufficient amount of coinage resulted in collection of the call price amount, the refund of any excess amounts deposited, and generation of a dial enable signal on the lead 56 by the changer 52. In the former instance, if the caller deposits an amount in coins equal to or greater than the call period amount, collection of the call period amount is effected, a refund of any excess amounts deposited is made, and the changer 52 generates a timer activation pulse on the lead 94 in the same manner and with the same results as when the changer 52 generated a pulse on the lead 94 after detecting a call completion signal on lead 92, as previously described. The generation of this timer activation pulse on the lead 94 by the changer 52 results in detectable changes in the amount of current flowing through the circuit and the recognition of this current variation by phone company equipment, as previously described, effects the resetting of the call period timer to permit the phone conversation to be extended.

Specific reactions of various phone systems and phone company equipment to the current variation occasioned by generation of a timer activation pulse on the lead 94 may depend not only upon the characteristics of the phone company equipment, but also upon whether or not the coins were deposited before or after the call period timer timed out and activated the phone company recording. As coins are deposited, their value may begin to accumulate in the entry means 42. If sufficient coinage is accumulated prior to the timing out of the timer, the phone system equipment may detect the resultant circuit current variation and recognize it as a pay ahead signal which is to be stored until the call period timer has timed out, at which time the stored signal will effect a resetting of the timer and extend the call without any necessity of activating the phone company recording. If a sufficient amount of coinage is not accumulated until after the timer has timed out, however, the recording will already have been activated and detection of the current variation by the phone system equipment may then cause both deactivation of the recording and a resetting of the timer, all without any necessity of signal storage. It is recognized that many variations are possible and that treatment by various phone systems of signals made available to them by the subject device depends upon the characteristics of the particular phone system with which the subject device is employed.

If the caller fails to deposit sufficient coinage within some set time interval after the timer has timed out and activated the recording, the telephone system call control means may break the circuit established between the caller and the called party and thereby terminate the call. If this occurs and the caller has deposited an amount less than the call period price which is still being retained by the changer 52, that amount will be returned to the caller when he activates the escrow switch 78, such as by hanging up his handset, as previously described.

Once the call has been terminated or concluded and the parties hang up, the telephone system call control means will effect a second polarity reversal on the leads 18 and 20 which will return the leads to a condition wherein lead 18 is positive with respect to lead 20. This second polarity reversal will be detected by polarity detector 90 which will output a signal on lead 92 to remove changer 52 from a call completed condition. The subject device is thereafter available for the placing of further calls in like fashion.

Although the amount required for an additional call period time is generally conveniently set equal to the call price for the initial call period time, the prices for the periods may be different and additional circuitry may be employed with the subject device to provide for the presence of differently valued signals on the terminals 54 depending upon whether an initial call period or an additional time period is desired. Determination of which signals are present on terminals 54 may depend upon whether the changer 52 is in a call completed condition or not and may also be dependent upon other factors programmed into the additional circuitry, such as the hour of the call or the distance between the location of the subject device and the called phone. Different prices may also be established on the terminals 54 by phone system control, such as by the generation of pulse coded signals on the leads 18 and 20 which may be sampled and decoded by pulse detection circuitry attached to the terminals 54, for example. Such call price information circuitry would depend greatly upon the particular characteristics of the phone system with which it is employed.

It should be noted that the optional timer activation circuitry shown in FIG. 3 has been described with the lead 94 normally maintained in a low state by changer 52. In the circuitry described timer activation pulses are generated on the lead 94 causing it to momentarily change from a low to a high state, thus affecting the operation of the optical coupler 84 and resulting in an increased current flow through the timer activation circuit, as previously described, for the duration of the timer activation pulse. It is recognized that a lead $\overline{94}$ (not shown), the complement of the lead 94, maintained in a normally high state by changer 52 with low-going timer activation pulses being generated thereon, could alternatively be employed to control the conductivity of coupler 84. If such were the case, the optical coupler 84 and the rest of the timer activator circuitry would respond in a manner opposite from that previously described and the reactions thereof would result in a decreased current flow through the circuit for the duration of the timer activation pulse, but the amount of current required from the battery for operation of the timer activator circuit would be less than if the lead 94, which is normally maintained low, were used to control coupler 84. The current drain on the battery would be less if lead $\overline{94}$ were employed since optical coupler 84 would be maintained in a normally non-conducting mode by the normally high state of lead $\overline{94}$, instead of being maintained in a normally conductive state by the normally low state of lead 94. This option reduces the current drain on the battery 16 and the battery can therefore be more easily maintained in a fully charged or substantially fully charged state by the trickle charging, previously described, from the phone line leads.

As has been previously noted, the characteristics of various telephone systems may differ and various current detection means may be employed thereby. With certain telephone systems, therefore, it may be desirable to include inverting or other circuitry in the timer activation circuit to effect current changes therein that will be properly detectable by the particular phone system with which the circuit is employed. Typical of the type circuitry that might be employed would be a timer activation circuit, similar to that shown in FIG. 3, in which a lead $\overline{94}$, as previously described, would be maintained in a normally high state and in which the emitter of transistor portion 86 of coupler 84, instead of being connected directly to one side of the resistor 88, as shown in FIG. 3, would be connected to the base of a transistor having its collector and emitter connected across resistor 88 and having a biasing resistor connected between its base and collector. Such a circuit would draw less current than the circuit of FIG. 3 yet would effect detectable current changes in the timer activation circuit similar to those produced by the circuit of FIG. 3 and would be compatible with the same phone system as would the circuit of FIG. 3. The Darlington transistor described is only one of many, various types of optional circuitry that may be included in the timer activation circuit. When the lead $\overline{94}$ remains normally high the coupler is maintained non-conductive and the Darlington transistor is held "on" by the biasing resistor connected between its base and collector, thereby essentially shorting out the resistor 88 and permitting a relatively large current flow between nodes 83 and 85. When the lead $\overline{94}$ pulses low the coupler 84 will begin to conduct, causing the Darlington transistor to turn "off" and thus decreasing the current flow since substantially all current will then be passing through resistor 88. It should be evident, however, that many other circuits may be similarly employed to produce detectable current changes in much the same fashion as has already been described, and that the particular circuits employed will depend to some extent upon the characteristics of the particular phone systems with which the circuits are employed. It should also be recognized that the particular circuit employed will affect any modification which might be required to interface a particular, known changer, such as the changer described in U.S. Pat. No. 3,841,456, with circuitry of the type described above. It will be appreciated that this is partially due to the fact that extending an in process call takes place at a time when polarity reversal has occurred as opposed to the initial placing of a call which takes place prior to polarity reversal, and that, depending upon the particular changer employed, certain additional or different modifications in the changer circuitry might be employed than would be employed if the changer were utilized in the embodiment of FIG. 2. In determining what modifications, if any, might be made in a particular instance with reference to a particular, known changer, those knowledgeable in the art will recognize that one method of achieving desired results would be to utilize the status of lead 92 from polarity detector 90 of the present invention to control generation, depending upon whether polarity reversal had previously occurred, of the Dial Enable signal on lead 56 and/or an appropriate signal on lead 94 (or $\overline{94}$) to effect a detectable current change, such as has been described.

Although the present invention has been described for use with a phone system that experiences polarity reversal of the phone line leads upon call completion and call conclusion, it may also be employed with phone systems that do not experience such polarity reversals but which instead provide some other form of detectable call completion signal on the phone line leads. For instance, if the system were to employ pulse coded signals on the phone line leads to signal call completion, a pulse code detection circuit could be employed in place of a polarity detector to detect call completion and to effect collection of the call price amount and refund of excess amounts deposited. Similarly, other types of call completion detection means can be tailored to the particular characteristics of the phone systems with which devices constructed according to the present invention are used.

The present control means represents an important advance in the art of pay telephones because it combines certain features known to the vending industry to a pay telephone in a way which advantageously takes into account characteristics of phone systems, including such characteristics as the polarity reversals that occur in many standard phone systems, and employment of a rechargeable battery or other energy source therewith, especially a rechargeable power source that receives charging current directly and more or less continuously from the telephone line for maintaining its charge, permits the employment in pay phone constructions of components that require relatively high currents and enables and facilitates construction of more versatile pay phone stations.

Thus, there has been shown and described a unique and versatile control circuit for pay telephones which fulfills all of the objects and advantages sought therefor. It will be apparent to those skilled in the art, however, that many changes, modifications, variations, and other uses and applications for the present means will become apparent after considering this specification and the accompanying drawings. All such changes, modifications, variations, and other uses and applications which do not depart from the spirit and scope of the invention are deemed to be covered by the invention which is limited only by the claims which follow.

What is claimed is:

1. Control means for electrically communicating a transmission control of a pay telecommunications station to a telecommunications system, comprising coin controlled means including a coin deposit unit for accepting coins of one or more denominations and producing a deposit signal representative of the value of each coin accepted during a telecommunications station operation, price control means for establishing a reference signal representative of the cost charge for effecting said electrical communication, entry means having a first input means connected to said coin deposit unit to receive each deposit signal and a second input means connected to said price control means to receive said reference signal, said entry means producing an output when the value of one or more coins accepted equals or exceeds the cost charge, output control means having an input connected to said entry means to receive said output, said output control means including switch means having a first connection to the transmission control and a second connection to said telecommunications system, said switch means including means for responding to said output to effect an electrical communication between said first and said second connections, and refund means operatively connected to said entry means, said refund means being operable independently of the specific coins deposited during that telecommunications station operation, and including means responsive to said output to effect exact payback of any excess amount accepted.

2. The control means defined in claim 1 including means to supply power for energizing said control means, said means including a rechargeable power supply device electrically connected to said coin controlled means.

3. The control means of claim 2 wherein said power supply means includes means for electrically connecting said power supply device to said communications system for recharging said power supply device.

4. The control means of claim 1 wherein said entry means includes means responsive to said output for generating a refund signal when the value of one or more coins accepted exceeds the cost charge, said refund means including input means connected to said entry means to receive said refund signal.

5. The control means defined in claim 1 including escrow demand means operatively connected to said coin controlled means, said escrow demand means including means capable of being activated prior to generation of said output to effect refund of an amount equal to the value of all coins accepted.

6. The control means of claim 5 wherein said escrow demand means includes means for producing an escrow demand signal and said entry means includes third input means connected to said escrow demand means to receive said escrow demand signal and escrow control means responsive to said escrow demand signal for controlling the refund of the amount accepted.

7. The control means defined in claim 6 including inhibit means connected to respond to said output of said entry means, said inhibit means including means to prevent said escrow control means from responding to said escrow demand signal.

8. The control means of claim 1 wherein said switch means includes an optical coupler and an isolation diode connected in parallel between said first and second connections of said switch means, said diode having an anode electrically connected to said first connection and a cathode electrically connected to said second connection, said optical coupler having first and second terminals respectively electrically connected to the first and second connections, said optical coupler being operatively connected to said entry means and responsive to said output to effect electrical communication between said first and second terminals of said optical coupler.

9. Control means for electrically communicating a transmission control of a pay telephone to a telephone system, comprising coin controlled means including a coin acceptor unit for accepting coins of one or more denominations deposited therein, said coin acceptor unit including means for producing a deposit signal corresponding to the value of each acceptable coin deposited during a pay telephone operation, price control means for establishing a reference signal representative of the cost of a call, entry means operatively connected to said coin unit and said price control means, said entry means being responsive to said reference signal and one or more of said deposit signals for producing an output when the value of one or more coins accepted at least equals the cost of a call, said entry means including means responsive to said reference signal and one or more of said deposit signals to generate a refund signal when the value of one or more coins accepted exceeds the cost of a call, output means operatively connected to said entry means, said output means including coupling circuit having a first lead electrically connected to the transmission control of said pay telephone and a second lead electrically connected to said telephone system, said coupling circuit means responding to said output to effect electrical communication between said first lead and said second lead, and refund means operatively connected to said entry means, said refund means being operable independently of the specific coins deposited during that pay telephone operation, and including means responding to said refund signal to refund the exact excess accepted.

10. The control means defined in claim 9 including power supply means operatively connected to energize said coin controlled means, said power supply means including a chargeable power supply device.

11. The control means defined in claim 10 including means operatively connecting said power supply device to said telephone system to derive charging current therefrom.

12. The control means of claim 9 wherein said coupling circuit means includes an optical coupler having first and second terminals respectively electrically connected to said first and second leads of said coupling circuit means, said coupler having a third terminal operatively connected to receive said output of said entry means, said coupler responding to said output to effect an electrical communication between said first and second terminals.

13. The control means of claim 9 wherein said entry means includes data storage means for storing a data signal and means operatively connected to said data storage means and to said coin acceptor unit for updating said data signal in response to receipt of each of said deposit signals.

14. The control means of claim 13 wherein said updating means includes comparator means operatively connected to said data storage means and to said price control means, said comparator means including means for comparing the data signal stored by said data storage means and said reference signal.

15. The control means of claim 13 wherein said updating means includes adder means.

16. The control means of claim 9 wherein said entry means includes means for inhibiting the acceptance by said coin acceptor unit of further coins deposited therein while the excess accepted is being refunded.

17. The control means of claim 9 wherein said entry means includes a counter.

18. The control means defined in claim 9 including escrow means operatively connected to said entry means, said escrow means including means capable of being activated prior to generation of said output to effect refund of the full amount deposited.

19. The control means of claim 9 wherein said price control means includes a plurality of switches, the combined settings of which establish the reference signal.

20. The control means of claim 9 wherein said price control means includes circuit means electrically connected to said telephone system for detecting signals generated in said telephone system representative of call pricing information and means for converting the detected signals to said reference signal.

21. The control means of claim 9 wherein said refund means includes means for generating a coin return signal for each coin returned and said entry means includes means responsive to each said coin return signal, said responsive means including means for preventing further refund when an amount equal to the excess amount accepted has been refunded.

22. The control means of claim 21 wherein said responsive means includes data storage means for storing a data signal and means operatively connected to said data storage means and to said refund means for updating said data signal stored in said data storage means in response to each of said coin return signals.

23. Control means for electrically communicating a transmission control of a pay telephone to a telephone system including a phone line having leads of opposite polarity and means for reversing the polarities on said leads, comprising coin controlled means including a coin acceptor unit for accepting coins of one or more denominations deposited therein and producing a deposit signal corresponding to the value of each coin accepted during a pay telephone operation, price control means for establishing a reference signal representative of the cost of a telephone call, entry means operatively connected to said price control means and said coin acceptor unit to receive said reference signal and each deposit signal, said entry means including means for producing an output signal when the value of one or more coins accepted at least equals the cost of a call and including means for generating a refund signal when the value of one or more coins accepted exceeds the cost of a call, output means operatively connected to said entry means, said output means including a coupling circuit having a first terminal electrically connected to one of the phone line leads of said telephone system and a second terminal electrically connected to the transmission control of said pay telephone, said coupling circuit being responsive to said output signal to effect an electrical communication between said first terminal and said second terminal, and refund means operatively connected to said entry means and responsive to said refund signal, said refund means being operable independently of the specific coins deposited during that pay telephone operation, and including means to refund the exact excess deposit accepted.

24. The control means defined in claim 23 including polarity detection mans operatively connected to said phone line leads, said detection means including an output lead and means for producing a polarity reversal signal on said output lead when the phone line leads experience a reversal from a first polarity relationship to a second polarity relationship, said entry means including inhibit means operatively connected to said output lead of said detection means, said inhibit means preventing the generation of said refund signal until receipt of said polarity reversal signal.

25. The control means of claim 24 wherein said coupling circuit includes first and second circuit portions connected in parallel between said first and second terminals of said coupling circuit, said first circuit portion including first current value means to permit current to flow therethrough when the phone line leads have said second polarity relationship and to substantially prevent current flow therethrough when the phone line leads have said first polarity relationship, said second circuit portion including second current valve means in series with coupler means, said second current valve means permitting current flow therethrough when the phone line leads have said first polarity relationship and substantially preventing current flow therethrough when the phone line leads have said second polarity relationship, said coupler means being operatively connected to said entry means and responding to said output signal to effect electrical communication between said second current valve means and said second terminal of said coupling circuit.

26. The control means of claim 25 wherein said current valve means are diodes.

27. The control means of claim 25 wherein said coupler means is an optical coupler.

28. The control means defined in claim 23 including rechargeable power supply means operatively connected to energize said coin controlled means, said power supply means including means connected to said phone line leads to derive charging current therefrom.

29. The control means defined in claim 23 including status detection means electrically connected between said phone line leads, said detection means including means for detecting polarity status of the phone line leads and for producing a first status output when the phone line leads have a first polarity relationship and a second status output when the phone line leads have an opposite second polarity relationship, said entry means including signal generation means operatively connected to said status detection means, said signal generation means producing an output when the phone line leads have said second polarity relationship and the value of one or more coins accepted at least equals the cost of a call, said output means including an activator circuit having first and second terminals respectively electrically connected to said first and second terminals of said coupling circuit, said activator circuit being operatively connected to said signal generation means and responsive to said output of said signal generation means to effect a change in the current flowing through said activator circuit between said first and second terminals thereof.

30. The control means of claim 29 wherein said coupling circuit includes first coupler means and first current valve means connected in series between said first and second terminals of said coupling circuit, said first coupler means having first and second terminals, one of said terminals being electrically connected to said first current valve means and the other of said terminals being electrically connected to one of said terminals of said coupling circuit, said first current valve means permitting current flow therethrough when the phone line leads are in said first polarity relationship and substantially preventing current flow therethrough when the phone line leads are in said second polarity relationship, said first coupler means operatively connected to said entry means and responding to said output signal therefrom to effect an electrical communication between said first and second terminals of said first coupler means, said activator circuit including first and second circuit portions, said first portion including second current valve means and a resistive element having first and second terminals connected in series between said first and second terminals of said activator circuit, said second current valve means being connected to permit current flow therethrough when the phone line leads have said second polarity relationship and to substantially prevent current flow therethrough when the phone line leads have said first polarity relationship, said second circuit portion including a second coupler means connected in parallel with said resistive element of said first circuit portion, said second coupler means having first and second terminals respectively electrically connected to said first and second terminals of said resistive element, said second coupler means including means for controlling electrical communication between said first and second terminals of said second coupler means, said second coupler means having two operative states, in one of which said controlling means enables said electrical communication and in the other of which said controlling means substantially prevents said electrical communication, said controlling means being operatively connected to said signal generation means and responding to the output therefrom to effect a change in state of said second coupler means.

31. The control means of claim 30 wherein said first and second current valve means are diodes and said first and second coupler means are optical couplers.

32. The control means defined in claim 30 including a chargeable power supply device operatively connected to said phone line leads to derive charging current therefrom, said power supply device having means electrically connected to said coin controlled unit to supply operating power therefor.

33. The control means of claim 31 wherein said chargeable power supply device is a storage battery.

34. In a telephone system including system call control means and a pay phone station having a transmission control means therewith, improvements in said pay phone station comprising coin controlled means including a coin unit for accepting one or more denominations of coins deposited therein and producing a deposit signal representative of the value of each coin accepted during a pay phone station operation, means for establishing a reference signal representative of the cost of a call, entry means including means for receiving said reference signal and each of said deposit signals, said entry means producing an output signal when the value of one or more coins accepted at least equals the cost of a call and generating a refund signal when the value of one or more coins accepted exceeds the cost of a call, output means responsive to said output signal for electrically communicating the transmission control means of said pay phone station to the system call control means of said telephone system, and means operable independently of the specific coins deposited during that pay phone station operation, and responsive to said refund signal to refund the exact excess amount accepted.

35. The improvements defined in claim 34 including a power supply and means operatively connecting said power supply to said coin controlled means.

36. The improvements of claim 35 wherein said power supply is a rechargeable power supply.

37. The improvements of claim 36 including means for electrically connecting said rechargeable power supply to said system call control means to derive charging current therefrom.

38. Control means for electrically communicating a transmission control of a pay telephone to a telephone system including means for generating a call completion signal, comprising coin controlled means including a coin acceptor unit for accepting coins of one or more denominations deposited therein during a pay telephone operation and producing a deposit signal corresponding to the value of each coin accepted, price control means for establishing a reference signal representative of the cost of a call, entry means operatively connected to said price control means and to said coin acceptor unit including means responsive to said reference signal and to each deposit signal, said entry means including first means for producing an output signal whenever the value of one or more coins accepted at least equals the cost of a call and second means for generating a refund signal whenever the value of one or more coins accepted exceeds the cost of a call, output means operatively connected to said entry means, said output means including a coupling circuit having a first terminal electrically connected to the telephone system and a second terminal electrically connected to the transmission control of said pay telephone, said coupling circuit including means responsive to said output signal to effect electrical communication between said first and second terminals, detection means operatively connected to said telephone system, said detection means including means for detecting a call completion signal generated by said telephone system and for producing an output in response thereto, refund means operatively connected to said entry means and to said detection means, said refund means being operable independently of the specific coins deposited during that pay telephone operation, and including means responsive to production of said output by said entry means and to said output of said detection means to effect payback of the exact excess accepted.

39. Control means for electrically commmunicating a transmission control of a pay telephone to a telephone system including means for generating call completion and call conclusion signals, comprising coin controlled means including a coin acceptor unit for accepting coins of one or more denominations and producing a deposit signal corresponding to the value of each coin accepted during a pay telephone operation, price control means for establishing a reference signal representative of the cost of a call, entry means operatively connected to said price control means and to said coin acceptor unit to receive said reference signal and each deposit signal, said entry means including means for producing an output signal whenever the value of one or more coins accepted at least equals the cost of a call, means for generating a refund signal whenever the value of one or more coins accepted exceeds the cost of a call, output means operatively connected to said entry means including a coupling circuit having a first terminal connected to said telephone system and a second terminal connected to the transmission control of said pay telephone, said coupling circuit including means responsive to said output signal to effect electrical communication between said first and second terminals, refund means operatively connected to said entry means and responsive to said refund signal, said refund means being operable independently of the specific coins deposited during that pay telephone operation, and including means to refund the exact excess deposit accepted, detection means operatively connected to said telephone system including means for detecting call completion and call conclusion signals and for establishing respective first and second outputs in response thereto, said outputs representing respective call completed and call concluded states of said telephone system, said entry means including signal generation means operatively connected to said detection means, said signal generation means producing an output when the telephone system is in a call completed state and the value of one or more coins accepted at least equals the cost of a call, said output means including an activator circuit having first and second terminals respectively connected to said first and second terminals of said coupling circuit, said activator circuit operatively connected to said signal generation means and responsive to the output thereof to effect a change in the current flowing through said activator circuit between said first and second terminals thereof.

40. In a pay phone station the improvement comprising a pair of terminals suitable for connection to a pair of telephone system phone line leads, one of which has a higher voltage level than the other, and coin controlled means for effecting a completed circuit between said terminals, said coin controlled means including coin deposit means for receiving coins of at least one denomination, control means operatively connected to said coin deposit means and including means responsive to the deposit of coins during a pay phone station operation for having entered therein the value of coins deposited, said control means including means for completing a circuit between said terminals to enable current flow therebetween when the value of coins deposited at least equals the call price, refund means operatively connected to said control means, said refund means being operable independently of the specific coins deposited during that pay phone station operation and including means to effect exact payback of any excess amount deposited whenever the circuit between said terminals is completed, and power supply means connected to said coin controlled means for supplying operating power therefor, said power supply means including a rechargeable power supply device and means connecting said power supply device to the phone line leads.

41. The improvement of claim 40 wherein said power supply device is a storage battery.

42. The improvement of claim 40 wherein said connecting means includes means for deriving uni-directional current from the phone line leads for charging said power supply device.

43. Control means in a pay phone station including a pair of terminals suitable for connection to a pair of telephone system phone line leads for completing a circuit between said terminals, comprising coin controlled means including a coin deposit unit for accepting coins of at least one denomination during a pay phone station operation, entry means operatively connected to said coin deposit unit and responsive to the acceptance of coins by said unit for having entered therein the value of coins accepted, said entry means including means for generating an output when the value of coins deposited at least equals the price of a call and payback control means for controlling the payback of amounts deposited in excess of the call price, output means operatively connected to said entry means including means responsive to said output for completing a circuit between said terminals to enable current flow therebetween, and refund means operable independently of the specific coins deposited during that pay phone station operation, and operatively connected to said payback control means including means responsive to outputs therefrom to pay back the exact excess deposit.

44. The control means of claim 43 wherein said output means includes a coupling circuit having a first connection means to one of said terminals and a second connection means to the other of said terminals, said coupling circuit responding to detection of said output to effect an operative communication between said first and second connection means.

45. The control means of claim 44 wherein one of said connection means includes transmission control means.

46. The control means defined in claim 43 including power supply means for supplying operating power to said coin controlled unit, said power supply means including a power supply device, means connecting said power supply device to said coin controlled means, and means to charge said power supply means including means connecting said power supply device to said terminals.

47. The control means of claim 43 wherein said coin controlled means includes a price control means for establishing the cost of a call, said price control means having output means operatively connected to said entry unit.

* * * * *

UNITED STATES PATENT OFFICE
CERTIFICATE OF CORRECTION

Patent No. 4,105,867   Dated August 8, 1978

Inventor(s) Joseph L. Levasseur and William A. Seiter

It is certified that error appears in the above-identified patent and that said Letters Patent are hereby corrected as shown below:

Column 3, line 56, after "44," insert

--vend or--

Column 6, line 64, "excrow" should be

--escrow--

Column 11, line 53, "94" should be

--$\overline{94}$--

Column 12, line 18, "activation" should be

--activator--

Column 16, line 51 "mans" should be

--means--

Signed and Sealed this

Twentieth Day of February 1979

[SEAL]

Attest:

RUTH C. MASON
Attesting Officer

DONALD W. BANNER
Commissioner of Patents and Trademarks